US012563248B2

(12) United States Patent
Xiao et al.

(10) Patent No.: US 12,563,248 B2
(45) Date of Patent: Feb. 24, 2026

(54) REDUCING ACTIVE USER BIAS FOR CONTENT RECOMMENDATION MODELS

(71) Applicant: ROKU, INC., San Jose, CA (US)

(72) Inventors: Fei Xiao, San Jose, CA (US); Pulkit Aggarwal, San Jose, CA (US); Abhishek Bambha, Burlingame, CA (US); Anirban Das, San Jose, CA (US); Ronica Jethwa, Mountain View, CA (US); Lian Liu, Mountain View, CA (US); Rohit Mahto, San Jose, CA (US); Jose Sanchez, San Jose, CA (US); Amit Verma, Sunnyvale, CA (US); Nam Vo, San Jose, CA (US); Ying Zhao, San Jose, CA (US)

(73) Assignee: Roku, Inc., San Jose, CA (US)

( * ) Notice: Subject to any disclaimer, the term of this patent is extended or adjusted under 35 U.S.C. 154(b) by 24 days.

(21) Appl. No.: 18/107,858

(22) Filed: Feb. 9, 2023

(65) Prior Publication Data

US 2024/0276041 A1     Aug. 15, 2024

(51) Int. Cl.
*H04N 21/2365* (2011.01)
*G06N 20/00* (2019.01)
*H04N 21/24* (2011.01)
*H04N 21/25* (2011.01)
*H04N 21/258* (2011.01)
*H04N 21/43* (2011.01)
*H04N 21/442* (2011.01)
*H04N 21/45* (2011.01)
(Continued)

(52) U.S. Cl.
CPC ........... *H04N 21/251* (2013.01); *G06N 20/00* (2019.01); *H04N 21/25883* (2013.01)

(58) Field of Classification Search
None
See application file for complete search history.

(56) References Cited

U.S. PATENT DOCUMENTS

2012/0166285 A1* 6/2012 Shapiro ................. G06Q 50/01
705/14.66
2017/0161618 A1* 6/2017 Swaminathan ......... G06F 16/23
(Continued)

*Primary Examiner* — Brian T Pendleton
*Assistant Examiner* — Jean D Saint Cyr
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for reducing active user or active content category bias in content recommendation systems. An example embodiment operates by modifying a streaming event data set by selecting a voting algorithm. The voting algorithm reduces an impact of highly occurring data points by sampling the streaming event data set to generate a sampled streaming event data set, wherein the highly occurring data points comprise data points generated by the active users or the active content categories. The embodiment further trains, by a machine learning engine and based on the sampled streaming event data set, a machine learning model to generate a reduced bias content recommendation model and generates, based on the reduced bias content recommendation model, content recommendations for subsequent selection and rendering on a media device.

16 Claims, 10 Drawing Sheets

600

```
          RECEIVE A STREAMING EVENT DATA SET
                                            602

┌──────────────────┐   ┌──────────────────┐
   │ SAMPLE STREAMING │   │  SAMPLE MULTIPLE │
   │ EVENT DATA SET   │   │  RECOMMENDATION  │
   │              606 │   │  MODELS      608 │
   └──────────────────┘   └──────────────────┘

GENERATE REDUCED BIAS RECOMMENDATION     604
                     MODEL

RECEIVE A FIRST CALL TO THE RECOMMENDATION SYSTEM FOR
                RECOMMENDED CONTENT
                                            610

RECEIVE USER'S SELECTION OF CONTENT
                                            612

DISTRIBUTE CONTENT TO MEDIA DISPLAY SYSTEM
                                            614

DISPLAY CONTENT ON MEDIA DISPLAY DEVICE
                                            616
```

(51) Int. Cl.
H04N 21/466 (2011.01)
H04N 21/475 (2011.01)
H04N 21/647 (2011.01)

(56) References Cited

U.S. PATENT DOCUMENTS

2017/0277691 A1* 9/2017 Agarwal ............... H04L 67/306
2019/0102468 A1* 4/2019 He ......................... G06Q 50/01
2022/0012565 A1* 1/2022 Hansen ................ G06N 3/0442
2022/0122565 A1* 4/2022 Ozaki ..................... G09G 5/14

* cited by examiner

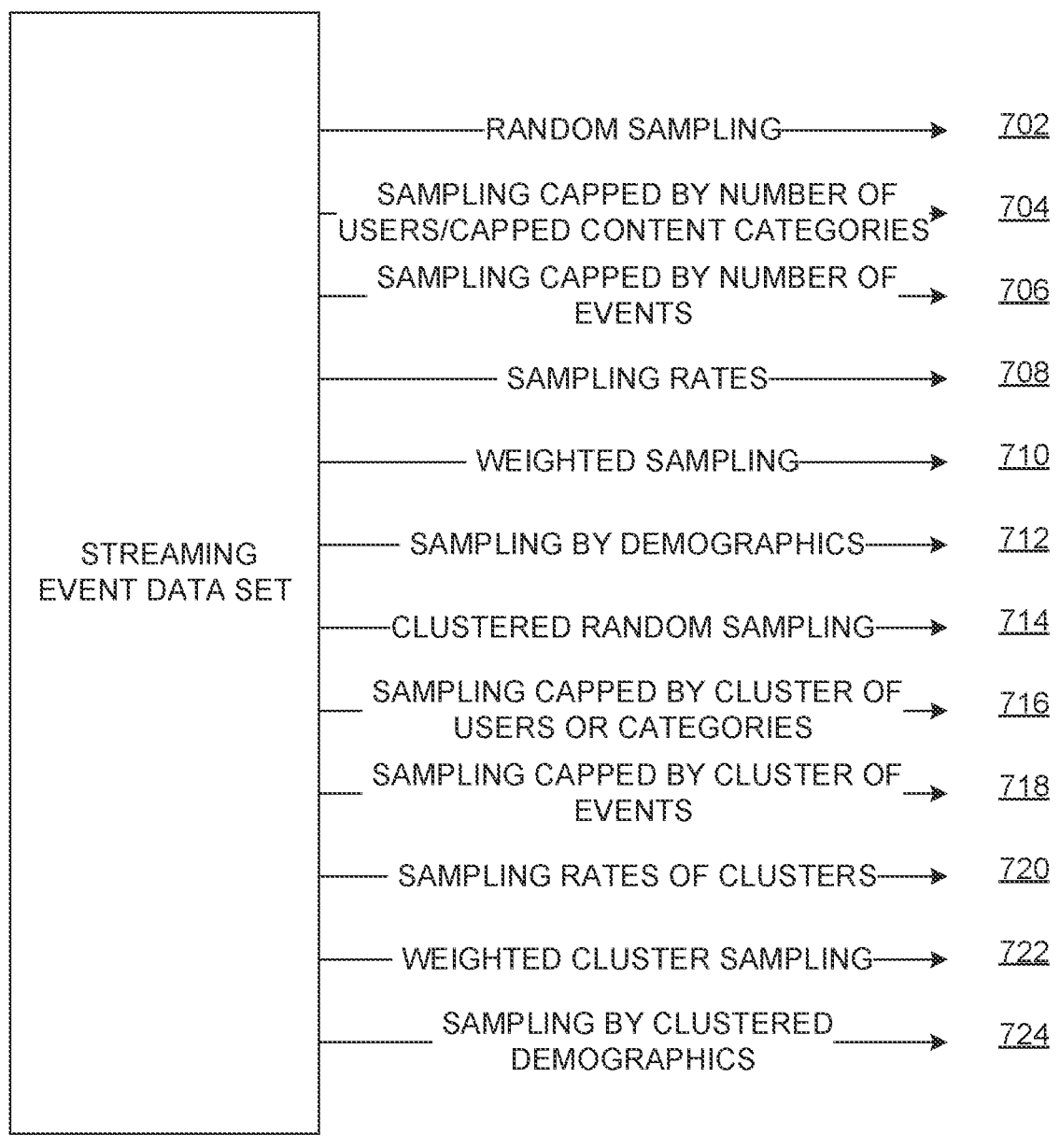

STREAMING EVENT DATA SET

RANDOM SAMPLING —————▶ 702

SAMPLING CAPPED BY NUMBER OF USERS/CAPPED CONTENT CATEGORIES ▶ 704

SAMPLING CAPPED BY NUMBER OF EVENTS —▶ 706

SAMPLING RATES —————▶ 708

WEIGHTED SAMPLING —————▶ 710

SAMPLING BY DEMOGRAPHICS ———▶ 712

CLUSTERED RANDOM SAMPLING ——▶ 714

SAMPLING CAPPED BY CLUSTER OF USERS OR CATEGORIES —▶ 716

SAMPLING CAPPED BY CLUSTER OF EVENTS —▶ 718

SAMPLING RATES OF CLUSTERS ——▶ 720

WEIGHTED CLUSTER SAMPLING ——▶ 722

SAMPLING BY CLUSTERED DEMOGRAPHICS —▶ 724

FIG. 7

REDUCING ACTIVE USER BIAS FOR CONTENT RECOMMENDATION MODELS

BACKGROUND

Field

This disclosure is generally directed to content recommendation models, and more particularly to reducing bias in content recommendation models.

Background

Content recommendation models are generated by training relevance and popularity models. As active users generate more training data than low activity users, when streaming events are used as training data for a machine learning (ML) platform, the content recommendation models will be biased towards an active user's interest. This kind of bias may help active users to find items of interest much easier and they may stream more. However, it may also neglect the low activity user's interests and potentially degrade relevance metrics for other content recommendations or acquisitions.

SUMMARY

Provided herein are system, apparatus, article of manufacture, method and/or computer program product embodiments, and/or combinations and sub-combinations thereof for reducing streaming activity based bias in content recommendations. In some embodiments, this training bias is reduced by implementing sampling algorithms against streaming activities of very active users or popular content categories. In some embodiments, this training bias is reduced by implementing sampling algorithms against content recommendation models.

BRIEF DESCRIPTION OF THE FIGURES

The accompanying drawings are incorporated herein and form a part of the specification.

FIG. 7 illustrates a block diagram of sampling a streaming event data set, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
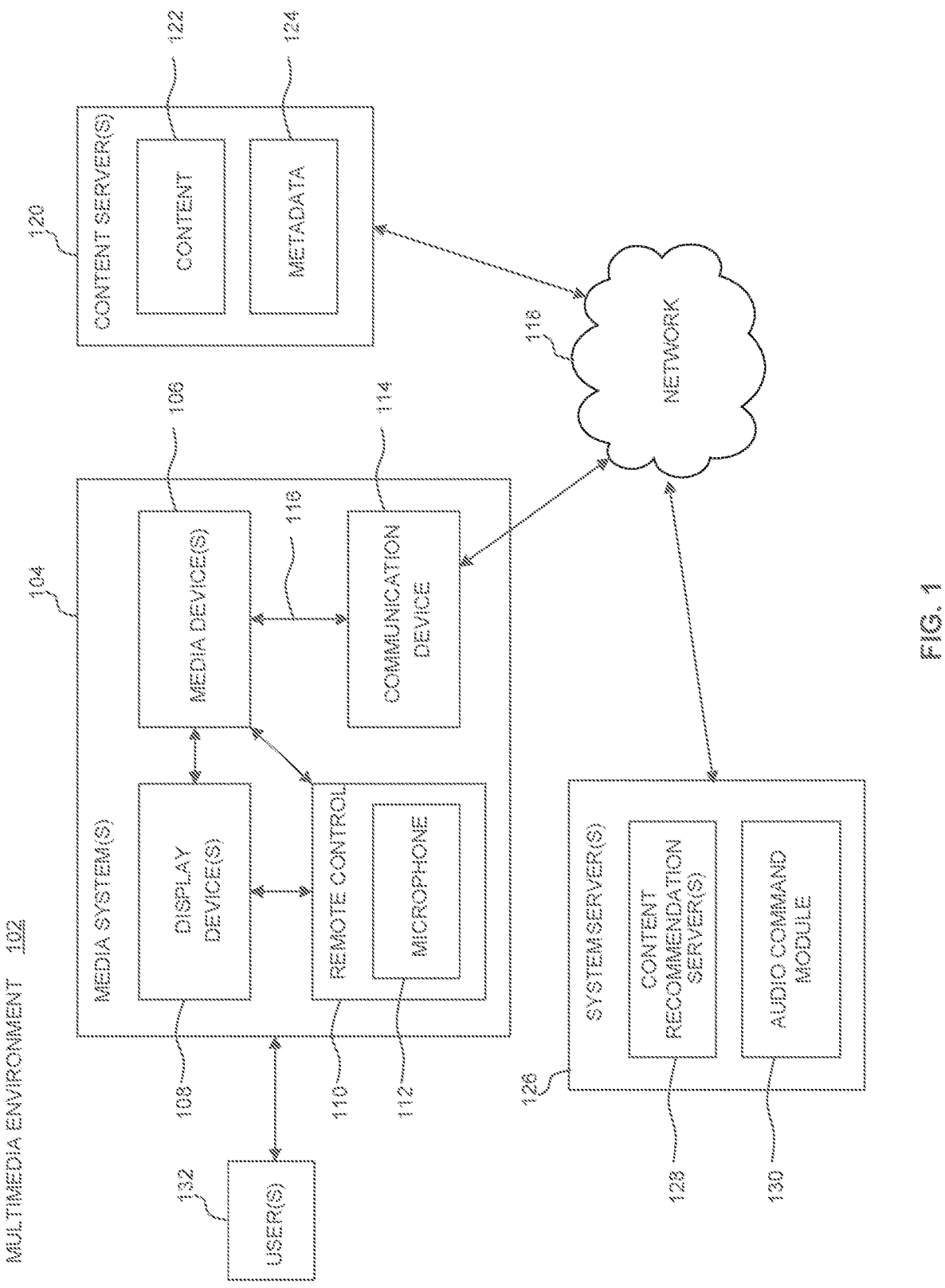
FIG. 1 illustrates a block diagram of a multimedia environment, according to some embodiments.

Disclosed herein are system, apparatus, article of manufacture, method and/or computer program product embodiments, and/or combinations and sub-combinations thereof, for reducing active user or active content category bias in content recommendation systems. An example embodiment operates by modifying a streaming event data set by selecting a voting algorithm. The voting algorithm reduces an impact of highly occurring data points by sampling the streaming event data set to generate a sampled streaming event data set, wherein the highly occurring data points comprise data points generated by the active users or the active content categories. The embodiment further trains, by a machine learning engine and based on the sampled streaming event data set, a machine learning model to generate a reduced bias content recommendation model and generates, based on the reduced bias content recommendation model, content recommendations for subsequent selection and rendering on a media device.

This bias in recommendation models may be incurred based on ML training data sets comprising overrepresented data sets. Underrepresented data sets, such as low activity users or content categories, will be subsequently underrepresented in the trained recommendation models. This bias may prevent the recommendation system from elevating potentially interesting content to this underrepresented group of users.

In some embodiments, sampling algorithms may be implemented with unique voting sequences. For example, co-occurring content, such as User A watches "Show A" and "Show B", may be only counted a limited number of times.

In some embodiments, sampling algorithms may be implemented against streaming activities of very active users in a training data set. For example, the sampling algorithms may limit selections directed to streaming or streaming events for customers in a specific demographic (e.g., ages 18-25) that may occur at a disproportionately larger number or rate relative to other age groups.

In some embodiments, these sampling algorithms may limit or cap sampling numbers (e.g., 10 streaming events) or rates for these very active users or groups of users. Very active users or content categories are defined as streaming events or streaming related events occurring disproportionately in users, user groups or content categories (e.g., genres). Streaming related events may include, but are not limited to, clicks, play requests, viewing times, viewing duration, content ratings, etc.

In some embodiments, these sampling algorithms cap sampling numbers or rates for very active content categories. Very active content categories are defined as popular categories of content, such as popular genres, or manually aggregated active categories of content. For example, streaming or streaming events for dramas, sitcoms and crime dramas may occur at a disproportionately larger number or rate relative to other categories. If a recommendation model is trained using this data set, it will be biased towards these very popular content categories. Low activity content categories will be underrepresented in the subsequently trained models. This bias may prevent the recommendation system from elevating potentially interesting content to underrepresented content categories.

In some embodiments, these sampling algorithms may have their sampling rates dynamically modified. For example, very active user's streaming events or related streaming events may be sampled at a lower rate relative to sampling rates of lower activity user's streaming events or related streaming events. For example, a machine learning platform may "under" sample the very active data sets and "over" sample the less active data sets.

In some embodiments, very active demographic user groups or content categories are sampled at a lower rate relative to sampling rates of lower activity demographic user groups or content categories. For example, the machine learning platform may "under" sample the very active demographic data sets and "over" sample the less active demographic data sets.

In some embodiments, these sampling algorithms may have their weighting dynamically modified. For example, very active demographic user groups or content categories may be weighted at a lower importance relative to weighting of lower activity demographic user groups or content categories. For example, the machine learning platform may weight a rare low active user streaming activity as an important data input.

In some embodiments, these sampling algorithms may dynamically modify sampling numbers of clusters or classes of very active users. For example, a cluster of popular content categories are sampled at a lower rate relative to sampling rates of a cluster of lower activity content categories.

In some embodiments, these sampling algorithms may dynamically modify sampling numbers of clusters of popular content categories. For example, popular content categories are grouped together and treated as a single category. This category is then sampled at a lower capped number of events or rate relative to sampling numbers or rates of clustered lower activity content categories. For example, very active user groups may be clustered such that N clusters each have the same effect on data set sizes. In a non-limiting example, a set of 10 users includes a first user with 15 streaming events as a first cluster. A second cluster would include the remaining 9 users that also include, in total, 15 streaming events.

In some embodiments, an ensemble model is implemented with random sampling of multiple recommendation models to form an ensemble model for bias reduction.

Any sampling rate, sampling number, cluster configuration, manually aggregated class, or ensemble may be selected without departing from the scope of the technology described herein.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to genre, writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to content recommendation embodiments and, thus, the system servers 126 may include one or more content recommendation servers 128.

For example, using information received from the media devices 106 in the thousands and millions of media systems 104, the recommendation server(s) 128 may identify content of interest by different users 132. Based on such information, the recommendation server(s) 128 may determine, for example, that this content may be presented to the users as a ranked list by popularity, genre or other ranking metric.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
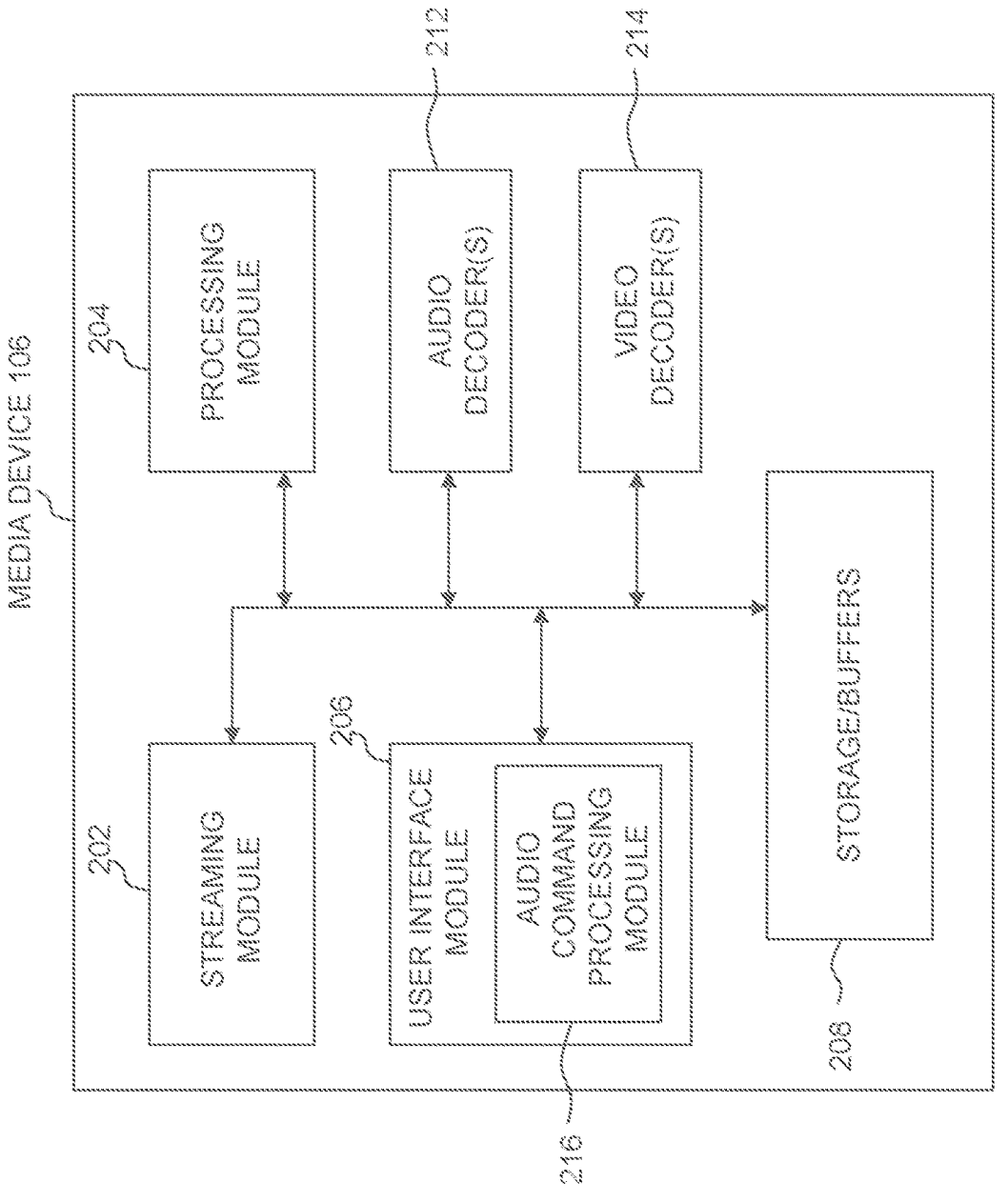
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Reduced Bias Sampling

Referring to FIG. 1, the media devices 106 may exist in thousands or millions of media systems 104. Accordingly, the media devices 106 may lend themselves to content recommendation solution embodiments.

In some embodiments, an over-the-top (OTT) media device or service may benefit from the embodiments disclosed herein. An over-the-top (OTT) media service is a media service offered directly to viewers via the Internet. OTT bypasses cable, broadcast, and satellite television platforms; the types of companies that traditionally act as controllers or distributors of such content. The term is most synonymous with subscription-based video-on-demand (SVoD) services that offer access to film and television content (including existing series acquired from other producers, as well as original content produced specifically for the service).

For example, using information received from the media devices 106 in the thousands and millions of media systems 104, the content recommendation server(s) 128 may identify similarities, overlaps and outliers between user content requests issued by different users 132 watching a particular genre. Based on such information, the content recommendation server(s) 128 may implement methods to remove bias from content recommendations that may enhance users' viewing experience.

The technology described herein implements reduced bias sampling algorithms and ensemble models and may, in some embodiments, include a unique voting algorithm. For example, in generating embedding for a recommendation, the system may only recognize top items and associations. However, based on a review of the data sets, active user bias may be identified. In some embodiments, a reduced biased embedding is built by identifying watching experiences for underrepresented user groups or content categories. Unique voting algorithms may remove bias as will be discussed in greater detail in the various embodiments disclosed in the figures and subsequent descriptions found hereafter.

OTT may also encompasses a wave of "skinny" television services that offer access to live streams of linear specialty channels, similar to a traditional satellite or cable TV provider, but streamed over the public Internet, rather than a closed, private network with proprietary equipment such as set-top boxes. Over-the-top services are typically accessed via websites on personal computers, as well as via apps on mobile devices (such as smartphones and tablets), digital media players (including video game consoles), or televisions with integrated Smart TV platforms.

Figure 3:
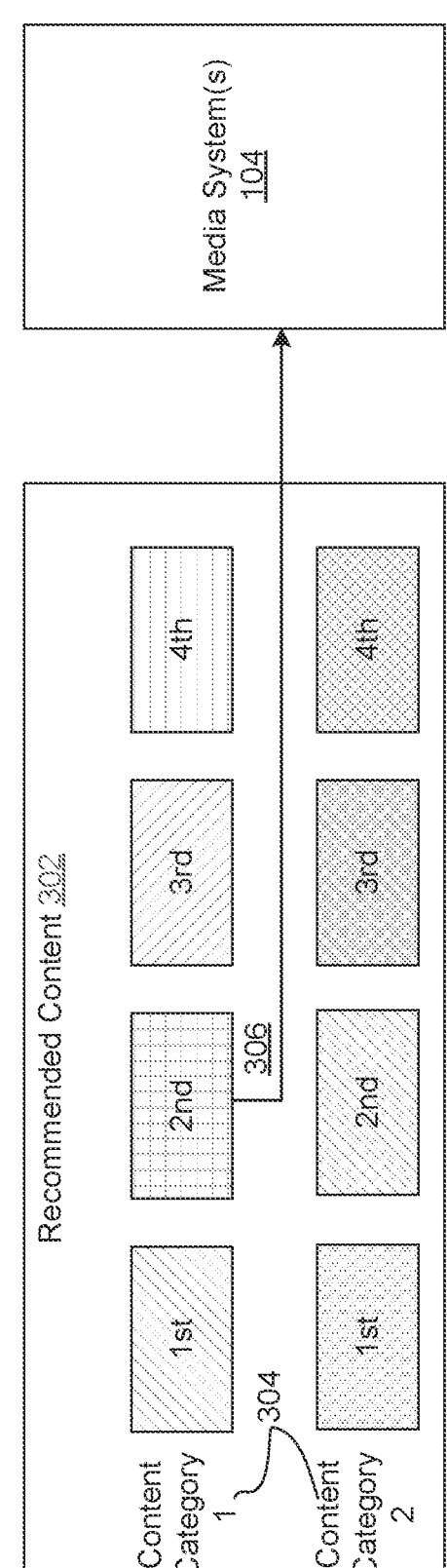
FIG. 3 illustrates a block diagram of a recommendation system result, according to some embodiments.

FIG. 3 illustrates a recommendation system with selected recommended content. FIG. 3 illustrates an example diagram of a content recommendation system 300, according to some embodiments. Content recommendation system 300 may be implemented with content recommendation server 128. Alternatively, or in addition to, one or more components of the content recommendation system 300 may be implemented within the media system 104, by third party platforms, a cloud-based system or distributed across multiple computer-based systems.

The following example illustrates how data bias generated by active users can affect relevance and popularity metrics. If we assume ten users, one active user may generate a high number of watch paired events based on watching "Show A" followed by watching "video games". However, there may be nine other less active users (e.g., less than 5 watch events). In this example group, the less active users watch "Show A" followed by watching "Show B". Based on the over representation of the active user when counting co-watch events, the content recommendation model will be trained to predict that the most similar item to "Show A" is "video games" instead of "Show B". The ML models leverage all users' votes (i.e., recommendations) as the ground truth or training data for prediction. However, the active user(s) will cause an in-balance in voting. Voting defines a number of data points generated by a user, for active users one user could generate one hundred data points, for an inactive user, one user could generate one data point.

In various embodiments, the technology described herein implements a system, apparatus, article of manufacture, method and/or computer program product embodiments, and/or combinations and sub-combinations thereof, for reducing bias in content recommendation system 300. This method allows the platform to present, as a recommendation, or set of recommendations, the most relevant personalized in-channel content which then correspondingly helps drive user reach.

Content recommendation systems are used in a variety of areas, with commonly recognized examples taking the form of playlist generators for movies, series, documentaries, podcasts, music services, and product recommendations, to name a few. In some embodiments, the playlist may be instantiated as a series of visual tiles of recommended content 302 displaying a sample image of the content or selectable movie trailer. The tiles may be arranged by some selected ordering system (e.g., popularity) and may be arranged in content groups or content categories 304, such as "trending", "top 10", "newly added", "sports", "action", etc.

A content recommendation system 300 is an information filtering system that seeks to predict a "rating" or "preference" a user would give to an item. A few commonly used recommendation approaches will be described hereafter, but other approaches, including future approaches may be interchanged herein without departing from the scope of the technology described.

One approach to the design of recommender systems that has wide use is collaborative filtering. Collaborative filtering is based on the assumption that people who agreed in the past will agree in the future, and that they will like similar kinds of items as they liked in the past. The system generates recommendations using information about rating profiles for different users or items. By locating peer users/items with a rating history similar to the current user or item, they generate recommendations using this neighborhood. Collaborative filtering methods are classified as memory-based and model-based. A well-known example of memory-based approaches is the user-based algorithm, while that of model-based approaches is the Kernel-Mapping Recommender.

A key advantage of the collaborative filtering approach is that it does not rely on machine analyzable content and therefore it is capable of accurately recommending complex items such as movies without requiring an "understanding" of the item itself. Many algorithms have been used in measuring user similarity or item similarity in recommender systems. When building a model from a user's behavior, a distinction is often made between explicit and implicit forms of data collection. An example of explicit data collection may include asking a user to rate an item. While examples of implicit data collection may include observing the items that a user views, analyzing item/user viewing times, keeping a record of content items that a user purchases, or building a list of items that a user has watched on one or more streaming platforms.

Another common approach when designing recommender systems is content-based filtering. Content-based filtering methods are based on a description of the item and a profile of the user's preferences. These methods are best suited to situations where there is known data on an item (name, location, description, etc.), but not on the user. Content-based recommenders treat recommendation as a user-specific classification problem and learn a classifier for the user's likes and dislikes based on an item's features.

In this system, keywords are used to describe the items, and a user profile is built to indicate the type of item this user likes. In other words, these algorithms try to recommend items similar to those that a user liked in the past or is examining in the present. It does not rely on a user sign-in mechanism to generate this often temporary profile. In particular, various candidate items are compared with items previously rated by the user, and the best-matching items are recommended.

Basically, these various methods use an item profile (i.e., a set of discrete attributes and features) characterizing the item within the system. To abstract the features of the items in the system, an item presentation algorithm is applied. A widely used algorithm is the tf-idf representation (also called vector space representation). The system creates a content-based profile of users based on a weighted vector of item features. The weights denote the importance of each feature to the user and can be computed from individually rated content vectors using a variety of techniques. Simple approaches use the average values of the rated item vector while other sophisticated methods use machine learning techniques such as Bayesian Classifiers, cluster analysis, decision trees, and artificial neural networks in order to estimate the probability that the user is going to like the item.

Content-based recommender systems can also include opinion-based recommender systems. In some cases, users are allowed to leave movie reviews or feedback on the items.

Features extracted from the user-generated reviews may improve meta-data of content items. Sentiments extracted from the reviews can be seen as users' rating scores on the corresponding features. Common approaches of opinion-based recommender systems utilize various techniques including machine learning, content recognition, facial recognition, sentiment analysis and deep learning as discussed in greater detail hereafter.

Using a "new series" example, the recommendation system would generate a content category 1 of a plurality of content categories 304 of recommended content 302 of new shows and order them (shown as tiles 1-4, etc.) based on viewership, expected viewership, desired viewership, to name a few. A user may select the second content image 306 in the first content category 304. This selection will be communicated from content server(s) 120 to the media system 104 for display on display device(s) 108.

Figure 4:
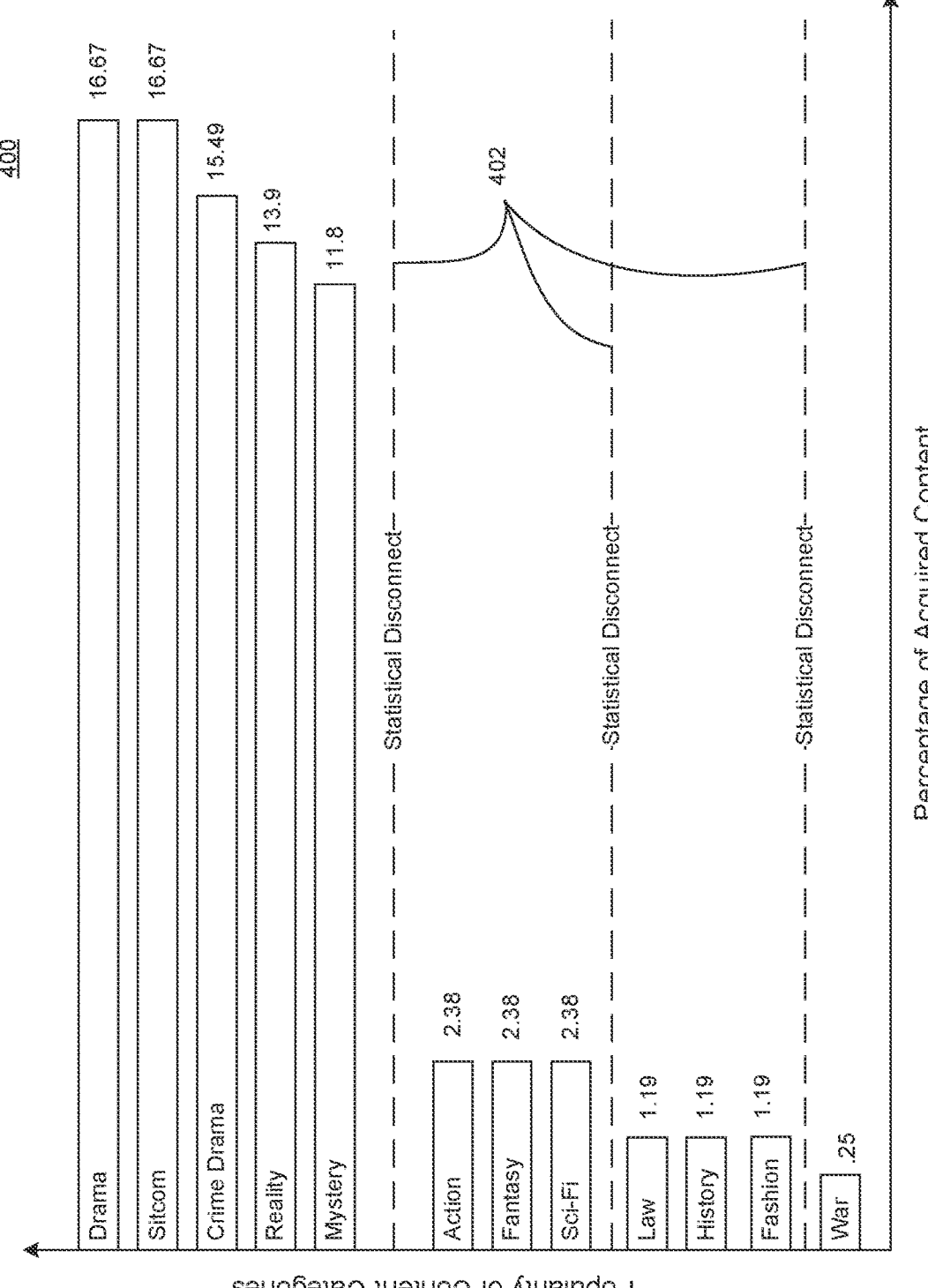
FIG. 4 illustrates a graph of acquired content categories, according to some embodiments.

FIG. 4 illustrates a graph 400 of a distribution of an acquired number of content titles based on popularity. As with content recommendations to users, active user bias may also be embedded in future content title acquisition recommendations. For example, this graph illustrates that, when more content titles are acquired for active user's interests, such as crime drama and sitcom, an imbalance in content categories (e.g., genre) is incurred. This graph is for illustration purposes only and the specific data shown is non-limiting to the technology described herein. For example, any number of content categories may be included and their popularity as a percentage of overall acquired content may vary, as is known. As shown, drama and sitcoms each hold a large percentage of overall content at 16.67% each. In addition, most content is acquired in the top 5 content categories at approximately 75% of the total content. However, between mystery and action, we see a statistical disconnect 402 in content identified by a large drop (e.g., 80%) in content titles acquired. Statistical disconnects may be determined by mathematical algorithms and occur at any point where a statistically relevant variation occurs. In addition, many disconnects may exist within a single data set. For example, a statistical relevant variation may also occur between, between Sci-fi and Law, between Fashion and War, to name a few. Each time the data set has a statistical disconnect, the lessor represented content categories may be underrepresented in a training data set relative to the higher represented content categories and therefore incur a bias of unfavorability.

A content recommendation system that trains its recommendation models using this data set will be biased towards recommending future content purchase in the top five content categories as it over-represents the data set of acquired content titles, while content categories below any of the potential disconnect lines will be either grossly underrepresented or not be recommended at all. Using the simplified example as shown in FIG. 3, only two recommended content categories 304 are displayed to the user. In this scenario, it is likely that the content title recommendations would come only from the Drama and Sitcom content categories. While it is understood that content acquisition recommendations may be presented in many content categories, they may be limited to overrepresented content categories and be arranged from most popular to least popular.

As described throughout, in some embodiments, this bias may be reduced by implementing sampling algorithms against activities of popular content categories.

Figure 5:
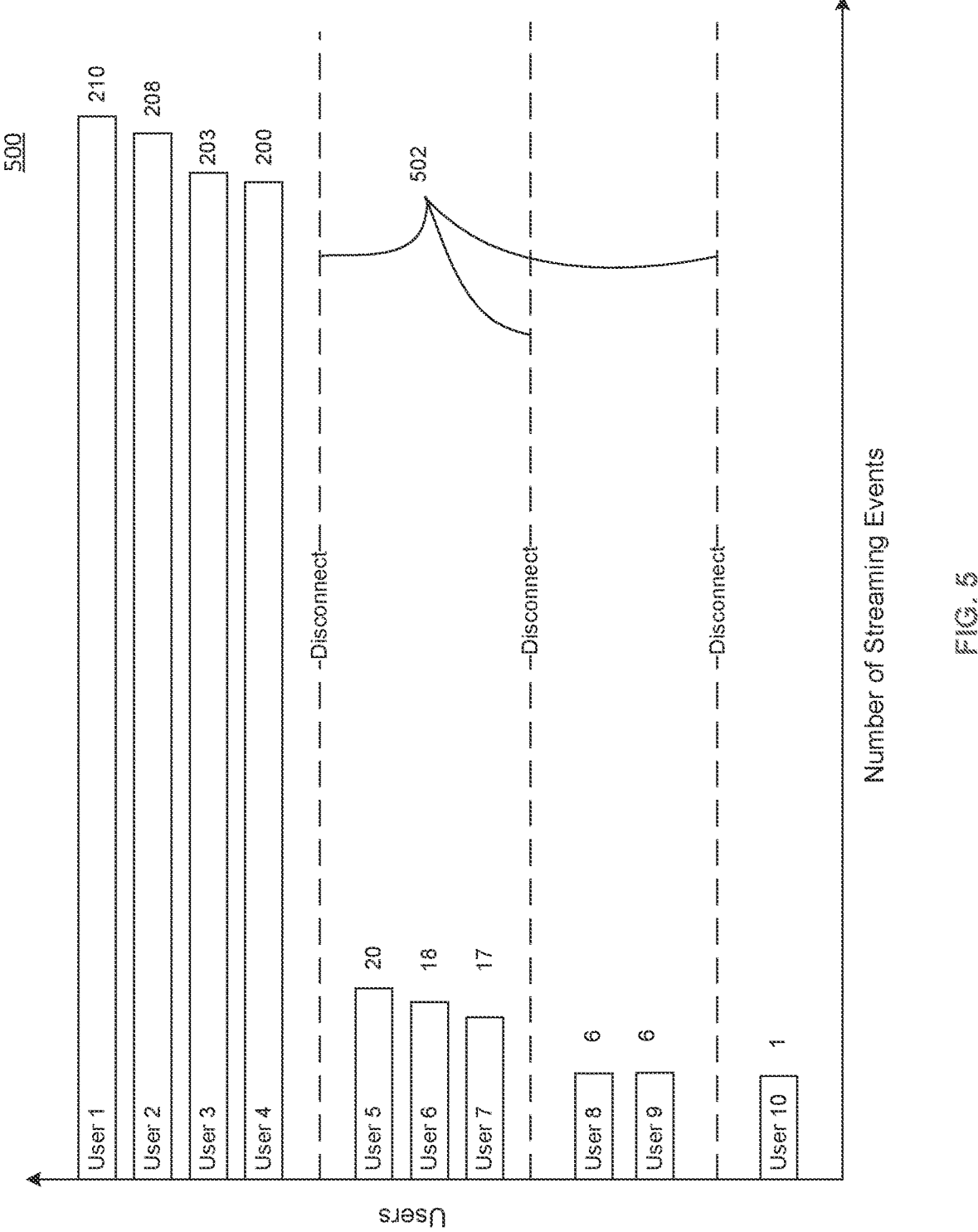
FIG. 5 illustrates a graph of user streaming events, according to some embodiments.

FIG. 5 illustrates a graph 500 of user streaming events (e.g., watching a specific content selection). This graph is for illustration purposes only and the specific data shown is non-limiting to the technology described herein. For example, any number of users may be included and their number or percentage of overall streaming events may vary, as is known. As shown, Users 1 holds a large number of overall streaming events at 210 of all streaming events. In addition, most streaming events are captured by the top 4 users at approximately 821 streaming events out of a total of 889. However, between User 4 and User 5, we see a statistical disconnect 502 in streaming events identified by a large drop (e.g., 10 fold) in streaming events. Statistical disconnects may be determined by mathematical algorithms and occur at any point where a statistically relevant variation occurs. In addition, many disconnects may exist within a single data set. For example, a statistical relevant variation may also occur between, between User 7 and User 8 and User 9 and User 10, to name a few. Each time the data set has a statistical disconnect, the lessor represented streaming events may be underrepresented in the training data set relative to the higher represented user streaming events and therefore incur a bias of unfavorability. In this scenario, the underrepresented Users (e.g., Users 5-10) will have their streaming events considered as not important, while Users 1-4 will have their streaming events considered important.

A content recommendation system that trains its recommendation models using this data set will be biased towards recommending content based on the top 4 users, as it over-represents the total number of streaming events, while users below any of the potential disconnect lines will be either grossly under-represented or not be recommended at all. Using the simplified example as shown in FIG. 3, only two recommended content categories 304 are displayed to the user. In this scenario, it is likely that a user would receive recommendations only based on the experiences of Users 1-4. While it is understood that a user may receive many recommendations, they may be limited to overrepresented user experiences and be arranged from most popular to least popular.

As described throughout, in some embodiments, this bias may be reduced by implementing sampling algorithms against streaming activities of very active users.

Figure 6:
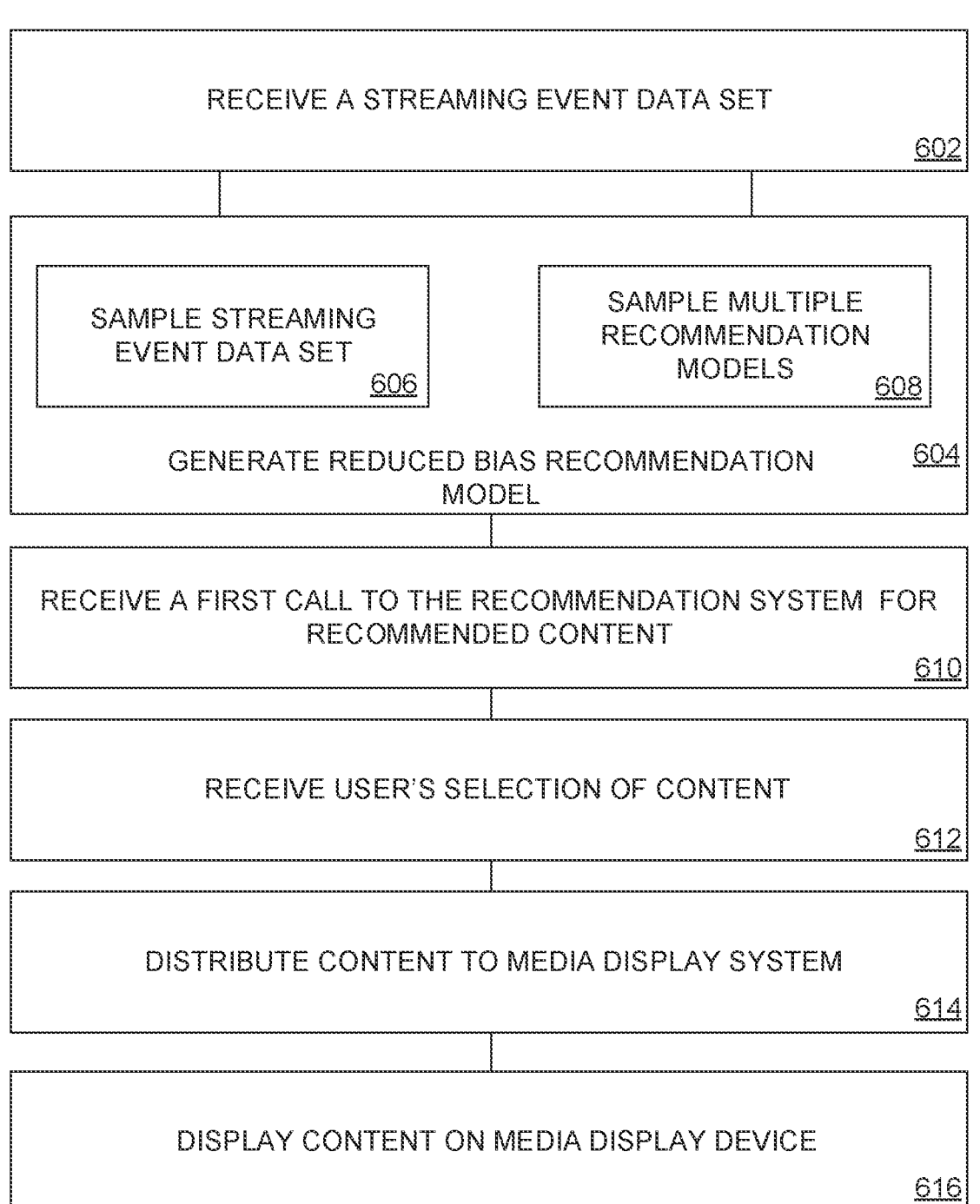
FIG. 6 illustrates a flow diagram implementing a reduced bias recommendation, according to some embodiments.

FIG. 6 is a flowchart for a method 600 for reducing bias in content recommendation models, according to an embodiment. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIG. 6. However, method 600 is not limited to that example embodiment.

In step 602, content recommendation server 128 receives a streaming event data set. The streaming event data set comprises, but is not limited to, historical clicks, play requests, viewing times, viewing duration, content ratings, etc. These streaming events are used as training data for a machine learning (ML) system.

Machine learning approaches are traditionally divided into three broad categories, depending on the nature of the data set available to the learning system; supervised learning, unsupervised learning, and reinforcement learning. In a first category, supervised learning, a machine learning engine is presented with a training data set including example inputs and their desired outputs, given by a "teacher", and the goal is to learn a general rule that maps inputs to outputs. In a second category, unsupervised learning, no labels are given to the learning algorithm, leaving the ML system on its own to find structure in its input. Unsupervised learning can be a goal in itself (discovering hidden patterns in data) or a means towards an end (feature learning). In a third category, reinforcement learning, a computer program interacts with a dynamic environment in which it must perform a certain goal (e.g., identify top recommendation targets by demographic). As it navigates its problem space, the program is provided feedback analogous to rewards, which it tries to maximize.

In 604, content recommendation server 128 implements one or more sampling algorithms to reduce or remove bias in the streaming event data set. In some embodiments, sampling algorithms may be implemented with unique voting sequences or algorithms. For example, paired watch content, may be only sampled (e.g., counted) a limited number of times.

In 606, the streaming event data set is sampled using the selected voting algorithm, to reduce or remove active user bias. For example, the streaming event data set is modified by extracting a number of data points from active and less active users. In another example, the streaming event data set is modified by extracting a number of data points from active and less active content categories (e.g., genres). In another example, the streaming event data set is modified by extracting a number of data points from groups (e.g., clusters) of active and less active users. In another example, the streaming event data set is modified by extracting a capped number of data points from active users or content categories. These examples are not exhaustive in nature and may be substituted by any sampling algorithm taught by the technology described herein.

In 608, content recommendation server 128 optionally implements one or more voting algorithms and sampling sequences to reduce or remove bias in trained recommendation models. For example, a plurality of recommendation models may be trained with an unmodified streaming event data set. However, the resulting set of recommendation models may be subsequently sampled to generate a new reduced bias model.

In 610, content recommendation server 128 receives a request from media system 104 for a content recommendation for User A or for a user profile (e.g., users age 18-25). The request may communicated over network 118. Alternatively, or in addition to, the recommendation may be pushed to the media system based on the user profile.

In 612, content recommendation server 128 receives a selection of desired content from media system 104. For example, a user 132 selects a recommended content tile from a displayed set of a plurality of recommended content tiles as previously described in FIG. 3.

In 614, content recommendation server 128 generates a request to content server 120 for content 122 and returns the entire content, part of the content or as a stream to be displayed 616 on display device 108.

FIG. 7 illustrates a diagram of example streaming event data set sampling methods, according to some embodiments. In the below described embodiments, a streaming event data set is modified or reduced by limiting or removing data points that may introduce bias into the streaming event data set. The modified streaming event data set is subsequently input as the training data set for training content recommendation models by a ML platform.

In some embodiments, a random sampling algorithm 702 modifies an input training data set by selecting users or content categories at random. Random sampling of all user or content category activity levels will reduce bias of the training data set by selecting from not just the most active users or popular content categories, but from other data points in the streaming event data set.

In some embodiments, sampling algorithms cap sampling numbers or rates (i.e., percentages) for very active users or content categories. Very active users disproportionately skew the data set towards streaming events that they generate. For example, a user having 200 streaming events in the training data set will over represent their interests. Likewise, a user having only a few streaming events will have their interests under-represented.

In some embodiments, capping may be implemented by defining an upper bound "U" for events for each user. A start time sampling interval, such as T1, T2, is defined and for each user event. The user event is sorted by timestamp and a random sampling start point from [T1, T2] or may use T1 as start time (as a recent event may be more important), get events for the user with #events<=U. This data sampling module can be built on top of a tracking/client log and consumed by all models to reduce the active user bias.

In some embodiments, capping may be implemented for any user by only voting X times for a past k days. Alternatively, or in addition to, a watch event pair may be capped by only selecting watch event pairs N times.

Very active content categories are defined as popular categories of content, such as popular genres, or manually aggregated active categories of content. For example, streaming or streaming events for dramas, sitcoms and crime dramas may occur at a disproportionately larger number or rate relative to other categories. In some embodiments, capping may be implemented for sampling a number of users 704 or number of events 706 from each user or content category. Using the previous example, user's with 200 or more streaming events sampled may be capped or limited to a number of these users. In another example, a user with 200 streaming events may be selected at a capped number of events, such as five events. Alternatively, or in addition to, the sampling rate 708 at which each user of content category is sampled may be capped. For example, only X percent of selections may come from each user or category. In this embodiment, very active user's streaming events or related streaming events are sampled at a lower rate relative to sampling rates of lower activity user's streaming events or related streaming events. For example, the machine learning platform may "under" sample the very active data sets and "over" sample the less active data sets.

In some embodiments, weighted sampling 710 may implemented. For example, very active demographic user groups or content categories may be weighted at a lower importance relative to weighting of lower activity demographic user groups or content categories. For example, the machine learning platform may weight a rare low active user streaming activity as a very important data input.

In some embodiments, sampling by demographics 712 may be implemented. For example, very active demographic user groups or content categories are sampled at a lower rate relative to sampling rates of lower activity demographic user groups or content categories. For example, the machine learning platform may "under" sample the very active demographic data sets and "over" sample the less active demographic data sets.

In some embodiments, the previously described sampling algorithms may be implemented against grouped or clustered data points. For example, very active users or popular content categories may be grouped together and treated as a single group or category. This group or category is then sampled using any of the previously described sampling algorithms. For example, very active user groups could be clustered such that N clusters each have the same effect on data set sizes. In a non-limiting example, a set of 100 users may include two users each with 200 streaming events as a first cluster. A second cluster would include the remaining 98 users that also includes, in total, 400 streaming events. While described for two clusters, users and content categories may be clustered in any manner and in any number of clusters without departing from the scope of the technology disclosed herein. For example, using the FIG. 4 data set example, each of the four disconnected content category groups could each be considered a cluster of an equal content category for sampling. As shown in FIG. 7, sampling of clusters may include, but is not limited to, clustered random sampling 714, sampling capped by cluster of users or categories 716, sampling capped by cluster of events 718, selecting sampling rates of clusters 720, weighted cluster sampling 722, or sampling by clustered demographics 724.

Figure 8:
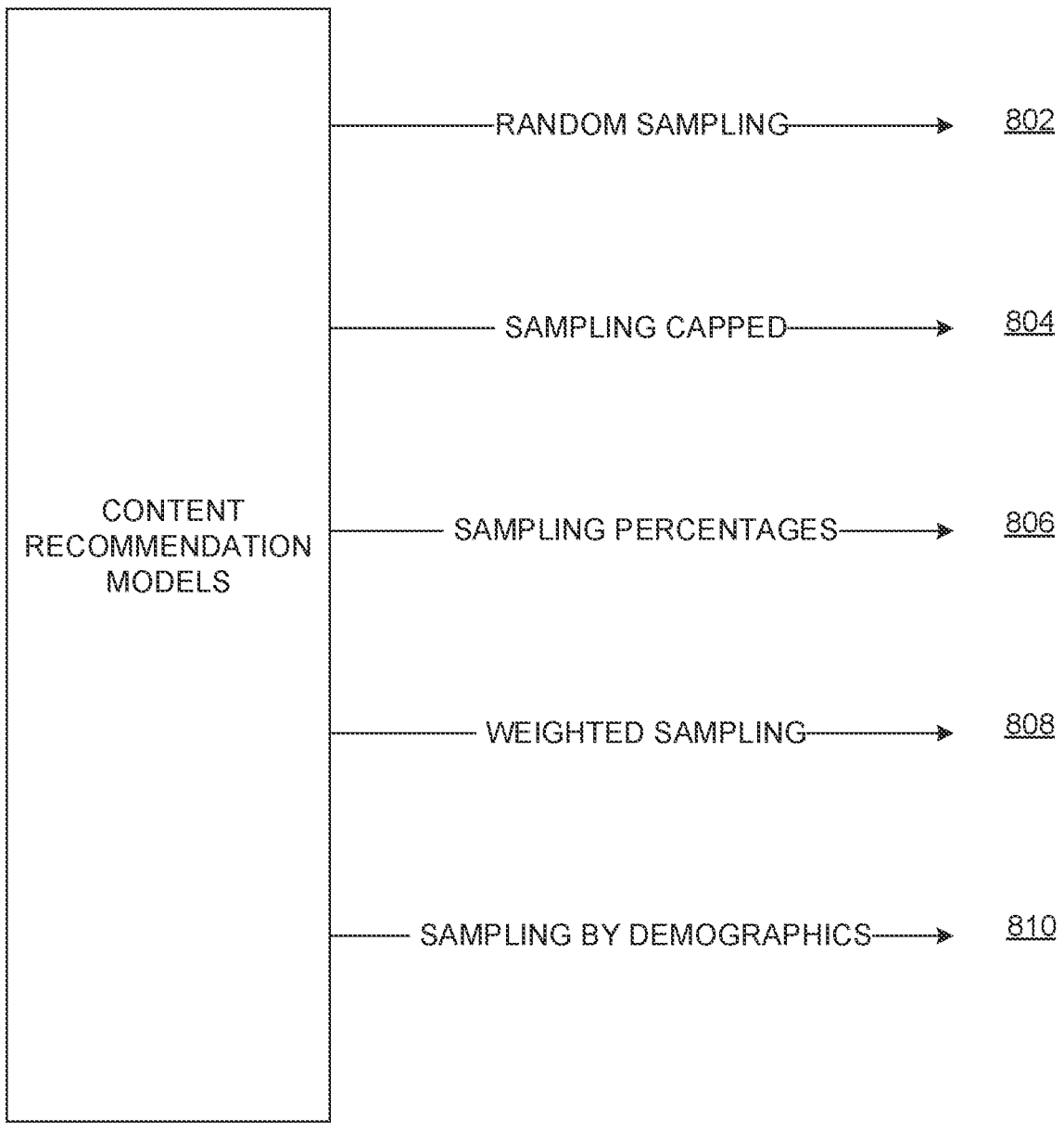
FIG. 8 illustrates a block diagram of sampling a streaming model set, according to some embodiments.

FIG. 8 illustrates a diagram of example recommendation model sampling methods, according to some embodiments. In the below described embodiments, an influence of one content model is modified or reduced by sampling from a plurality of recommendation models in an "ensemble model".

In some embodiments, an ensemble model is implemented with random sampling of multiple recommendation models to form an ensemble model for bias reduction.

Any sampling rate, sampling number, cluster configuration, manually aggregated class, or ensemble may be selected without departing from the scope of the technology described herein.

Figure 9:
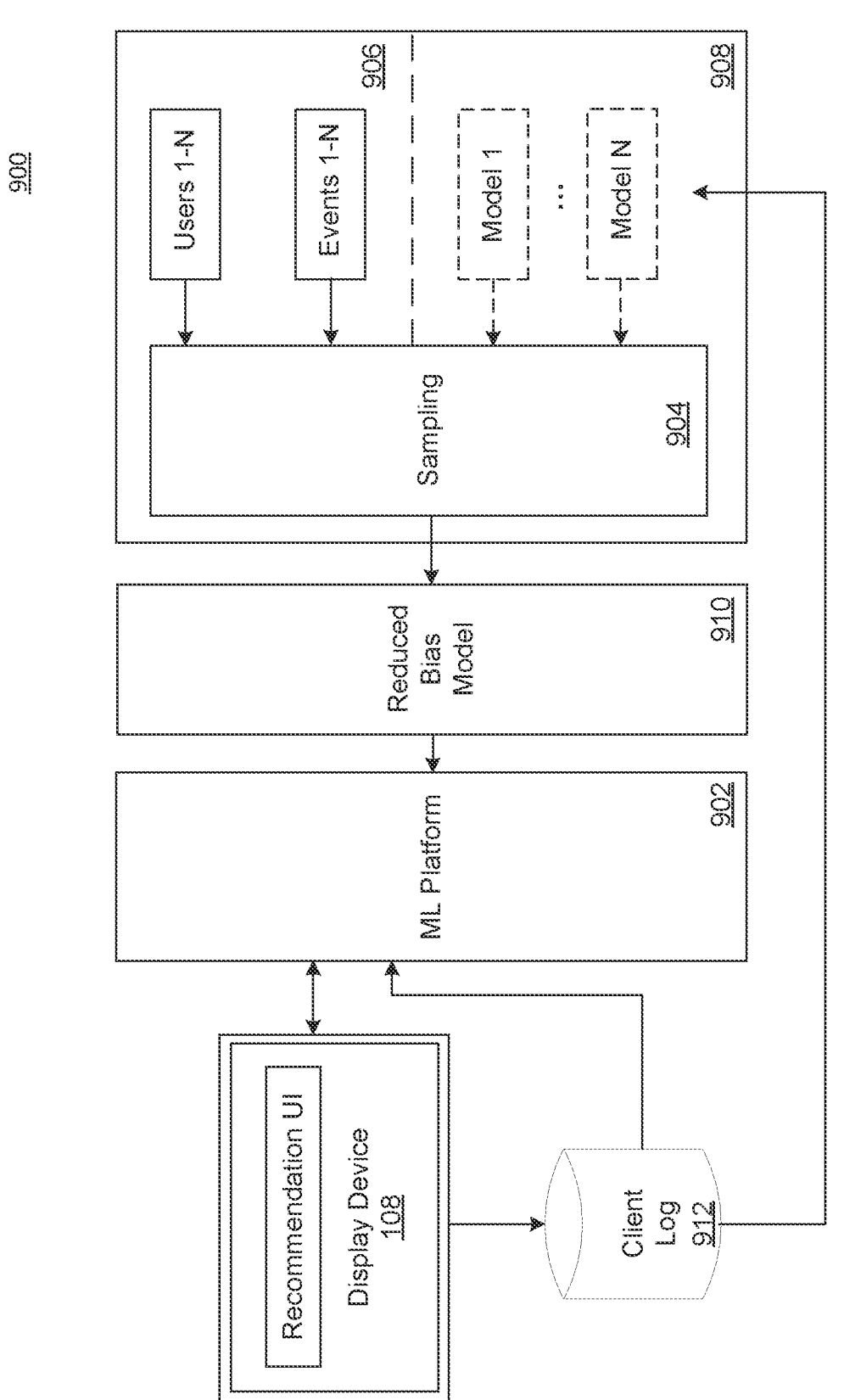
FIG. 9 illustrates a block diagram of a recommendation system, according to some embodiments.

FIG. 9 illustrates an example diagram of a recommendation system 900, according to some embodiments. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 9, as will be understood by a person of ordinary skill in the art.

Recommendation system 900 may be implemented with a machine learning platform 902. Machine learning involves computers discovering how they can perform tasks without being explicitly programmed to do so. Machine learning (ML) includes, but is not limited to, artificial intelligence, deep learning, fuzzy learning, supervised learning, unsupervised learning, etc. Machine learning algorithms build a model based on sample data, known as "training data", in order to make predictions or decisions without being explicitly programmed to do so. A machine learning engine may use various classifiers to map concepts associated with a specific content structure to capture relationships between concepts (e.g., watch signal topics) and the content. The classifier (discriminator) is trained to distinguish (recognize) variations. Different variations may be classified to ensure no collapse of the classifier and so that variations can be distinguished.

In some embodiments, machine learning models are trained with other customer's historical information (e.g., watch history). In addition, large training sets of the other customer's historical information may be used to normalize prediction data (e.g., not skewed by a single or few occurrences of a data artifact). Thereafter, the predictive models may classify a specific user's historic watch data based on positive (e.g., movie selections, frequency of watching, etc.) or negative labels (e.g., no longer watching, etc.) against the trained predictive model to predict preferences and generate or enhance a previous profile. In one embodiment, the customer specific profile is continuously updated as new watch instances from this customer occur.

In some embodiments, an output of the ML Platform 902 is a matrix of possible content choices based on matching a predicted user content selection. Client logs 912 may be stored and updated in a database. The client logs may provide user profile information that may be used to provide account and profile information based on associated identifiers (IDs). User streaming events are collected as historical information for the user's profile.

In an exemplary embodiment, the recommendation system 900 predicts the most the relevant and personalized content title for every user via a reduced bias model 910. A reduction in model bias may be obtained, in some embodiments, by modifying the training data set 906 by sampling 904 users or events in the training data set by any of the methods disclosed herein. Alternatively, or in addition to, existing or future content recommendation models 908 (Model(s) 1-N) may be sampled 904 by any of the methods disclosed herein to generate a reduced bias model 910 as an ensemble model.

Example Computer System

Figure 10:
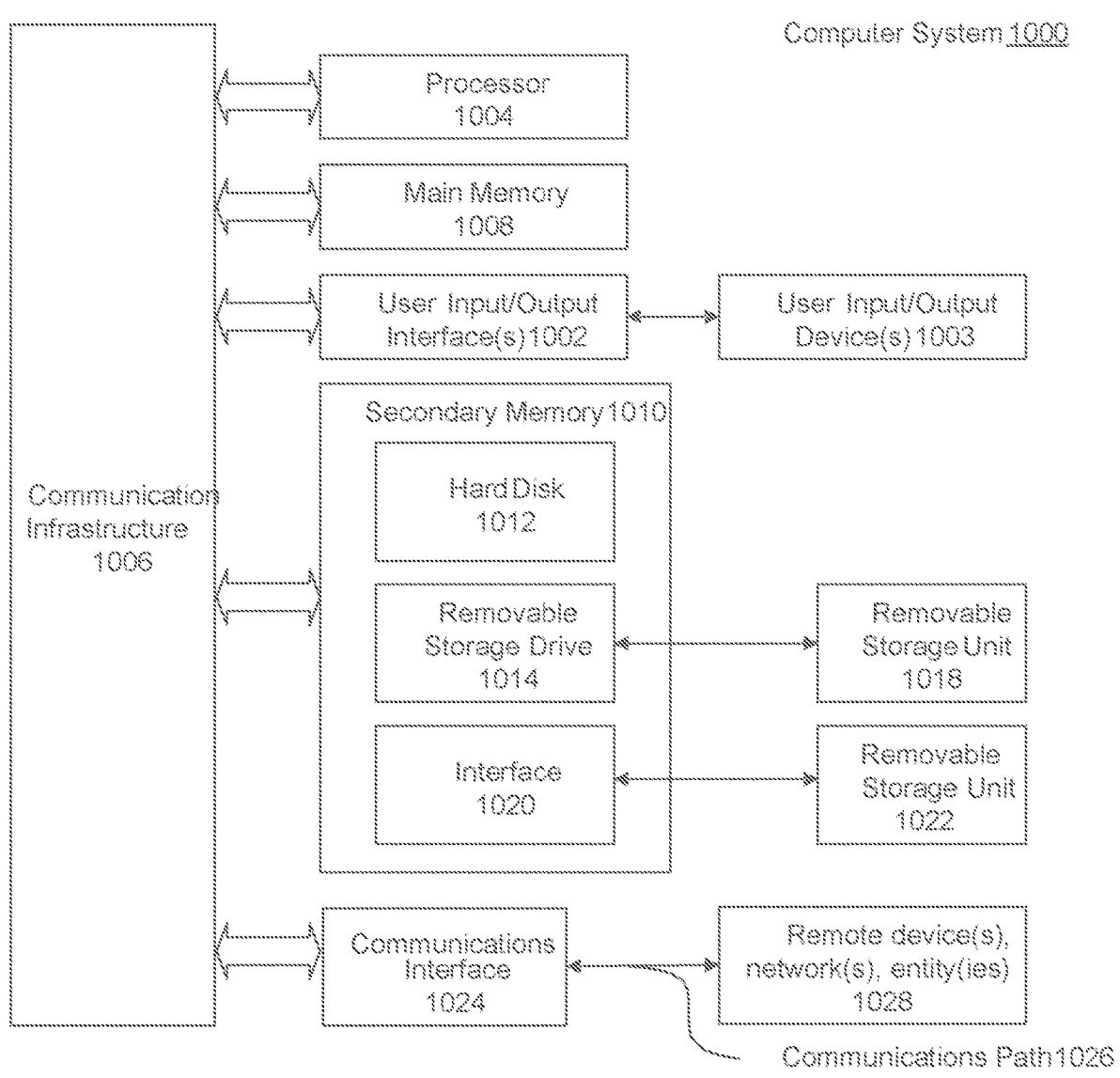
FIG. 10 illustrates an example computer system useful for implementing various embodiments.

Various embodiments may be implemented, for example, using one or more well-known computer systems, such as computer system 1000 shown in FIG. 10. For example, the media device 106 may be implemented using combinations or sub-combinations of computer system 1000. Also or alternatively, one or more computer systems 1000 may be used, for example, to implement any of the embodiments discussed herein, as well as combinations and sub-combinations thereof.

Computer system 1000 may include one or more processors (also called central processing units, or CPUs), such as a processor 1004. Processor 1004 may be connected to a communication infrastructure or bus 1006.

Computer system 1000 may also include user input/output device(s) 1003, such as monitors, keyboards, pointing devices, etc., which may communicate with communication infrastructure 1006 through user input/output interface(s) 1002.

One or more of processors 1004 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000 or processor(s) 1004), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for generating content recommendations, the computer implemented method comprising:

receiving, by a content recommendation system, a streaming event data set;

modifying the streaming event data set, the modifying comprising:

clustering, based on a relative activity level within the streaming event data set, user groups or content categories into a plurality of N clusters, wherein each of the N clusters includes an associated activity level identified based on a statistical disconnect between one or more of the associated activity levels, and wherein the statistical disconnect identifies a statistical relevant variation between a lower of the associated activity levels of a first of the user groups or content categories relative to a higher of the associated activity levels of a second of the user groups or the content categories;

selecting a voting algorithm;

dynamically modifying, based on the associated activity levels of the plurality of N clusters, the voting algorithm to sample one or more of the N clusters of the user groups or the content categories with the higher of the associated activity levels at a lower importance relative to a weighting of one or more of the N clusters of user groups or content categories with the lower of the associated activity levels;

reducing, based on the voting algorithm, an impact of highly occurring data points by sampling the streaming event data set to generate a sampled streaming event data set, wherein the highly occurring data points comprise data points generated by the higher of the associated activity levels of active users or active content categories; and training, by a machine learning engine and based on the sampled streaming event data set, a machine learning model to generate a reduced bias content recommendation model; and generating, based on the reduced bias content recommendation model, content recommendations for subsequent selection and rendering on a media device.

2. The computer implemented method of claim 1, wherein the highly occurring data points comprise watch event pair occurrences and the voting algorithm limits sampling of the watch event pair occurrences in the streaming event data set to N times.

3. The computer implemented method of claim 1, further comprising the voting algorithm randomly sampling data points in the streaming event data set.

4. The computer implemented method of claim 1, further comprising the voting algorithm limiting sampling of the highly occurring data points to X samples.

5. The computer implemented method of claim 1, further comprising the voting algorithm limiting sampling of the highly occurring data points to a capped sampling rate.

6. The computer implemented method of claim 1, further comprising the voting algorithm limiting sampling of the highly occurring data points to a capped number of the active users or a capped number of the active content categories.

7. The computer implemented method of claim 1, further comprising the voting algorithm sampling the highly occurring data points by demographics of the streaming event data set.

8. The computer implemented method of claim 1, wherein the media device comprises a streaming Over-the-Top (OTT) device.

9. A system, comprising:

a memory; and at least one processor coupled to the memory and configured to perform operations comprising:

receiving a streaming event data set;

modifying the streaming event data set, the modifying comprising:

clustering, based on a relative activity level within the streaming event data set, user groups or content categories into a plurality of N clusters, wherein each of the N clusters includes an associated activity level identified based on a statistical disconnect between one or more of the associated activity levels, and wherein the statistical disconnect identifies a statistical relevant variation between a lower of the associated activity levels of a first of the user groups or content categories relative to a higher of the associated activity levels of a second of the user groups or the content categories;

selecting a voting algorithm;

dynamically modifying, based on the associated activity levels of the plurality of N clusters, the voting algorithm to sample one or more of the N clusters of the user groups or the content categories with the higher of the associated activity levels at a lower importance relative to a weighting of one or more of the N clusters of user groups or content categories with the lower of the associated activity levels;

reducing, based on the voting algorithm, an impact of highly occurring data points by sampling the streaming event data set to generate a sampled streaming event data set, wherein the highly occurring data points comprise data points generated by the higher of the associated activity levels of active users or active content categories; and training, based on the sampled streaming event data set, a machine learning model to generate a reduced bias content recommendation model; and generating, based on the reduced bias content recommendation model, content recommendations for subsequent selection and rendering on a media device.

10. The system of claim 9, the operations further comprising limiting sampling of watch event pair occurrences in the streaming event data set to N times.

11. The system of claim 9, the operations further comprising the voting algorithm randomly sampling data points in the streaming event data set.

12. The system of claim 9, the operations further comprising the voting algorithm limiting sampling of the highly occurring data points to X samples.

13. The system of claim 9, the operations further comprising the voting algorithm limiting sampling of the highly occurring data points to a capped sampling rate.

14. The system of claim 9, the operations further comprising the voting algorithm limiting sampling of the highly occurring data points to a capped number of the active users or a capped number of the active content categories.

15. The system of claim 9, the operations further comprising the voting algorithm sampling the highly occurring data points by demographics of the streaming event data set.

16. A non-transitory computer-readable medium having instructions stored thereon that, when executed by at least one computing device, cause the at least one computing device to perform operations comprising:

receiving, by a content recommendation system, a streaming event data set;

modifying the streaming event data set, the modifying comprising:

clustering, based on a relative activity level within the streaming event data set, user groups or content categories into a plurality of N clusters, wherein each of the N clusters includes an associated activity level identified based on a statistical disconnect between one or more of the associated activity levels, and wherein the statistical disconnect identifies a statistical relevant variation between a lower of the associated activity levels of a first of the user groups or content categories relative to a higher of the associated activity levels of a second of the user groups or the content categories;

selecting a voting algorithm;

dynamically modifying, based on the associated activity levels of the plurality of N clusters, the voting algorithm to sample one or more of the N clusters of the user groups or the content categories with the higher of the associated activity levels at a lower importance relative to a weighting of one or more of the N clusters of user groups or content categories with the lower of the associated activity levels;

reducing, based on the voting algorithm, an impact of highly occurring data points by sampling the streaming event data set to generate a sampled streaming event data set, wherein the highly occurring data points comprise data points generated by the higher of the associated activity levels of active users or active content categories; and training, by a machine learning engine and based on the sampled streaming event data set, a machine learning model to generate a reduced bias content recommendation model; and generating, based on the reduced bias content recommendation model, content recommendations for subsequent selection and rendering on a media device.

* * * * *